June 7, 1966 S. L. BENDELL ETAL 3,255,304

ALIGNMENT OF TELEVISION CAMERA

Filed March 29, 1962 2 Sheets-Sheet 1

INVENTORS:
SIDNEY L. BENDELL,
ROBERT A. DISCHERT,
WILLIAM J. COSGROVE &
HENRY N. KOZANOWSKI
BY
[signature]
ATTORNEY June 7, 1966 S. L. BENDELL ETAL 3,255,304

ALIGNMENT OF TELEVISION CAMERA

Filed March 29, 1962 2 Sheets-Sheet 2

INVENTORS:
SIDNEY L. BENDELL,
ROBERT A. DISCHERT,
WILLIAM J. COSGROVE, &
HENRY N. KOZANOWSKI
BY
W. H. Sprague
ATTORNEY 3,255,304

ALIGNMENT OF TELEVISION CAMERA

Sidney L. Bendell, Haddon Heights, and Robert A. Dischert, Burlington Township, Burlington County, N.J., William J. Cosgrove, Lindwood, Pa., and Henry N. Kozanowski, Audubon, N.J., assignors to Radio Corporation of America, a corporation of Delaware Filed Mar. 29, 1962, Ser. No. 183,524
20 Claims. (Cl. 178—5.4)

This invention relates to the alignment of a television camera for proper operation and particularly to the alignment of a color television camera employing one pickup device for the luminance information and a plurality of other pickup devices for the chrominance information.

Two types of television cameras in present use respectively employ an image orthicon and a vidicon as pickup devices. Either type requires suitable adjustment to operate properly and at maximum efficiency. Because the two types of pickup devices have different operating characteristics the necessary adjustments are different and it is desirable that such adjustments be easily and quickly made by a camera operator.

One proposed type of color television camera employs a pickup device of the image orthicon type for derivation of luminance signal information and a plurality (such as three) separate pickup devices of the vidicon type for the derivation of the chrominance information. An advantage of this kind of color television camera over the three-tube variety presently in use is that high definition luminance signals may be derived directly from the image orthicon, thereby obviating the need for precise registration of the images on a three-tube color camera such as presently employed. The required relatively low resolution chrominance signal components may then be derived from the three vidicon tubes for the production of the composite chrominance signal specified in the color television system presently standardized for United States use by the Federal Communications Commission.

In order to secure the most efficient performance by such a four-tube color television camera, operating conditions must be chosen with a relatively high degree of precision. Such operating conditions include the channeling of the proper amounts of light to the various pickup tubes and the adjustment of the operating characteristics of these tubes so as to produce correct video signals. The image orthicon tube, for example, must be so adjusted that it operates up to the knee of its characteristic curve in order to secure optimum performance. Each pickup tube must produce the same amplitude video signal output for a given light input through the entire range of light values.

An object of this invention is to provide novel facilities for properly aligning the optical and electrical apparatus of a television camera.

Another object of the present invention is to provide novel facilities for aligning the optical and electrical apparatus embodied in a four-tube color television camera such that the camera operates properly and at maximum efficiency.

In accordance with this invention, the camera view finder is used to display three light bars, one representative of light admitted to the camera from a scene, another representative of a standardizing light and the third representative of the output signals from the camera. Adjustments of the optical and electrical camera control apparatus are made so as to produce equal intensity of light from all three bars.

In accordance with the present invention in a four-tube color television camera, the light of the proper color temperature which enters the camera is made equal to a certain standard illumination derived at a given speed of the optical system and the pickup tubes are adjusted to provide signals properly representative of this light. In making this camera alignment, the camera optical system, view finder and other normally provided apparatus is used. The optical system includes apparatus for diverting respective portions of the light admitted to the camera to the image orthicon luminance signal tube and to the three vidicon chrominance signal tubes. The camera apparatus also includes a view finder in the form of a relatively small screen kinescope observable by the camera operator and switching apparatus for impressing upon the view finder signals derived from any one of the four pickup tubes.

Additional apparatus, in accordance with this invention includes a first signal source by which to generate calibration pulses which, when impressed upon the view finder, produce a standard light output from the view finder screen. Also, as a second signal source, there is provided a photosensitive element so located as to effectively sample the intensity of the light admitted to the camera and to produce signals which, when impressed upon the view finder, cause light output from the view finder screen corresponding to the light admitted to the camera. By use of the normal camera facilities, any one of the pickup tubes comprises a third source of signals which can be selectively impressed upon the view finder to produce light commensurate with the signal output of the particular tube from which the signals are derived.

Means are provided to couple the three sources of signals sequentially to the view finder so as to display three adjacent light bars respectively representative of (1) standard light produced by the calibration pulses, (2) the light admitted to the camera, and (3) the video signals derived from the pickup tubes in response to the admitted light. The camera alignment is accomplished by making suitable adjustment of the optical and electrical components of the camera to make all three light bars of the same intensity.

The light admitted to the four-tube color television camera is controlled by an iris diaphragm in the main lens system so as to produce signals which match the standard light representative calibration pulses. The signals derived from the respective pickup tubes are controlled by suitable adjustment of the electrical circuits of the tubes to match the calibration pulses. Because the output signals from an image orthicon pickup tube do not linearly follow variations of the light impinging upon such a tube when it is over exposed, the maximum light for proper exposure and linear operation of the image orthicon pickup tube is controlled by a suitable neutral density filter placed in the light path of this tube. All of these adjustments are made by observation of the light bars produced on the view finder screen.

For a better understanding of the invention, reference now is made to the following detailed description which is taken in conjunction with the accompanying drawings, of which:

Figure 1:
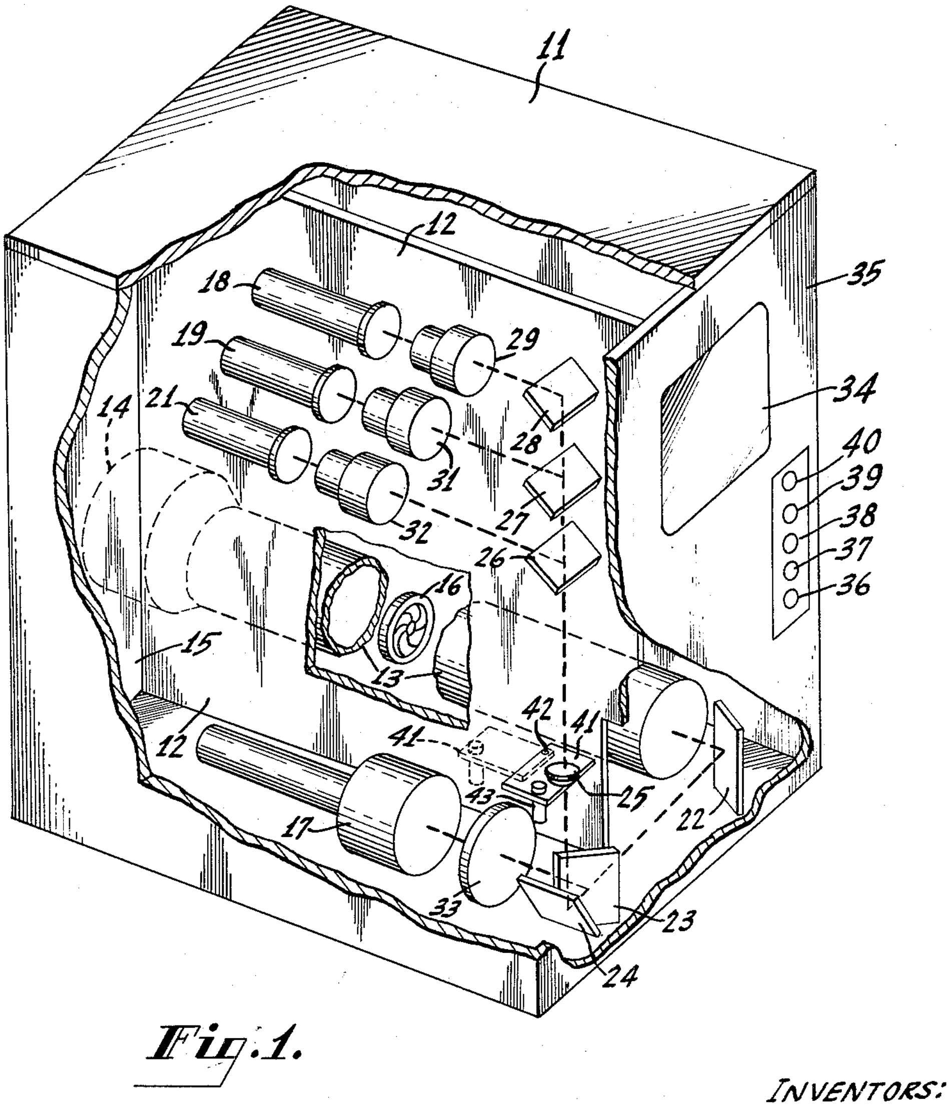
FIGURE 1 is a diagrammatic perspective view, partly broken away, of a four-tube color television camera to which the present invention relates.

FIGURE 1 shows the general arrangement of the color television camera to which the present invention relates. A housing 11 is generally divided into two compartments by a vertical partition 12. The various circuit components and other apparatus (not shown) with which the camera is provided is mounted on one or both sides of this partition. A main lens system 13 is mounted in the lower part of the compartment lying beyond the partition 12 as viewed in this figure. The particular lens system used in this apparatus is of the zoom or variable focal length type so that the camera may be focused on objects or scenes at any desired distance with varying angles of coverage. The front end 14 of the lens system projects beyond the forward wall 15 of the cabinet 11. Of the various optical components comprising the lens system 13 only an adjustable iris diaphragm 16 is pertinent to the present invention. This diaphragm is suitably located in the lens system to vary the amount of light gathered from the subject and admitted to the camera for direction toward the pickup tubes.

A relatively high definition luminance signal pickup tube such as an image orthicon 17 is mounted in the lower part of the compartment on the near side of the partition 12 as viewed in this figure. Three relatively low resolution chrominance signal pickup tubes such as the green, red and blue vidicons 18, 19 and 21 respectively are mounted, one above the other, on the near side of the partition 12. In the image orthicon tube the impressed light produces an electron image that is transferred to a target electrode which is scanned by an electron beam to generate output signals. Light impressed upon a vidicon tube changes the conductivity of an electrode which is scanned by an electron beam to generate output signals.

In addition to the main lens system 13, the optical system of the camera includes a total light reflector 22 to divert light issuing from the main lens system 13 toward the pickup tubes. A partial light reflector 23 (e.g. half-silvered mirror) reflects a portion of the light toward the image orthicon 17 and transmits the remaining light to a second total light reflector 24. This latter reflector directs light upwardly through a field lens 25 toward the vidicon pickup tubes 18, 19 and 21. A dichroic reflector 26 reflects the blue light component toward the blue vidicon 21 and transmits the red and green components. A dichroic reflector 27 reflects the red light component toward the red vidicon 19 and transmits the green light component to another total light reflector 28 which reflects it toward the green vidicon 18.

The green, red and blue vidicons 18, 19 and 21 are provided respectively with objective lenses 29, 31 and 32. The image orthicon 17 is provided with a variable neutral density filter 33.

The main lens system 13, in conjunction with the reflectors 22, 23 and 24, produces an image of the scene on the photosensitive electrode of the image orthicon 17. These optical components also form a space image of the scene in the plane of the field lens 25. This lens, in conjunction with the objective lenses 29, 31 and 32, focuses an image of the scene upon the photosensitive electrodes of the green, red and blue vidicons 18, 19 and 21.

The camera also includes a view finder in the form of a cathode ray tube mounted so that its screen 34 is positioned in the rear wall 35 of the cabinet 11. A plurality of switches 36, 37, 38, 39 and 40 also are mounted in the rear wall of the cabinet so that they are accessible to the camera operator who is in a position to observe the view finder screen 34.

The apparatus described up to this point includes the main elements of the color television camera which are essential to its operation. In addition, the camera is provided with other apparatus used in its alignment in accordance with the present invention. Such apparatus includes a shutter or optical mask 41 which is rotatable about a pivot 42 for positioning either as shown in solid lines or as indicated by the broken lines. In the position shown by the full lines, the mask 41 prevents light from approximately two-thirds of the scene from reaching the vidicons 18, 19 and 21. This is the position of the mask when it is used for adjustment of the operating characteristics of the camera. During use of the camera, the mark is pivoted to the position shown by the broken lines so that light from all parts of the scene is directed to the vidicon pickup tubes. The mask is effective to block the light from the portion of the scene by virtue of its positioning in the light path at the point at which the space image is formed by the main lens system 13. A light-detecting device such as a photodiode 43 (e.g. RCA type No. 7412) is mounted on the optical mask 41 so that, when the mask is in the camera alignment position shown by the solid lines, the light entering the system and controlled by the adjustable iris diaphragm 16 may be measured. While the photodiode is not exposed to all of the light admitted to the camera, it produces an output signal which is representative of this light.

The alignment of a four-tube color television camera of the type shown in FIGURE 1, when carried out in accordance with the present invention, is such that the camera may at all times be operated at a fixed and constant sensitivity level. For example, such a camera may be adjusted so that it is properly exposed when the main lens iris 16 is set to an optical speed of $f$:8.0 and the light entering the main lens is derived from a source such as a white target card having 100% reflectance under incident illumination of 250 foot lamberts. Under such conditions the image orthicon luminance signal pickup tube must be adjusted so that it is operating at or just below the knee of its exposure curve of signal output plotted against light input. Also, under these conditions, the output signal derived from the image orthicon must have a standardized voltage level representative of such white light in order to supply proper signals to other elements of the system for the production of a standard composite color television signal.

Figures 2, 3:
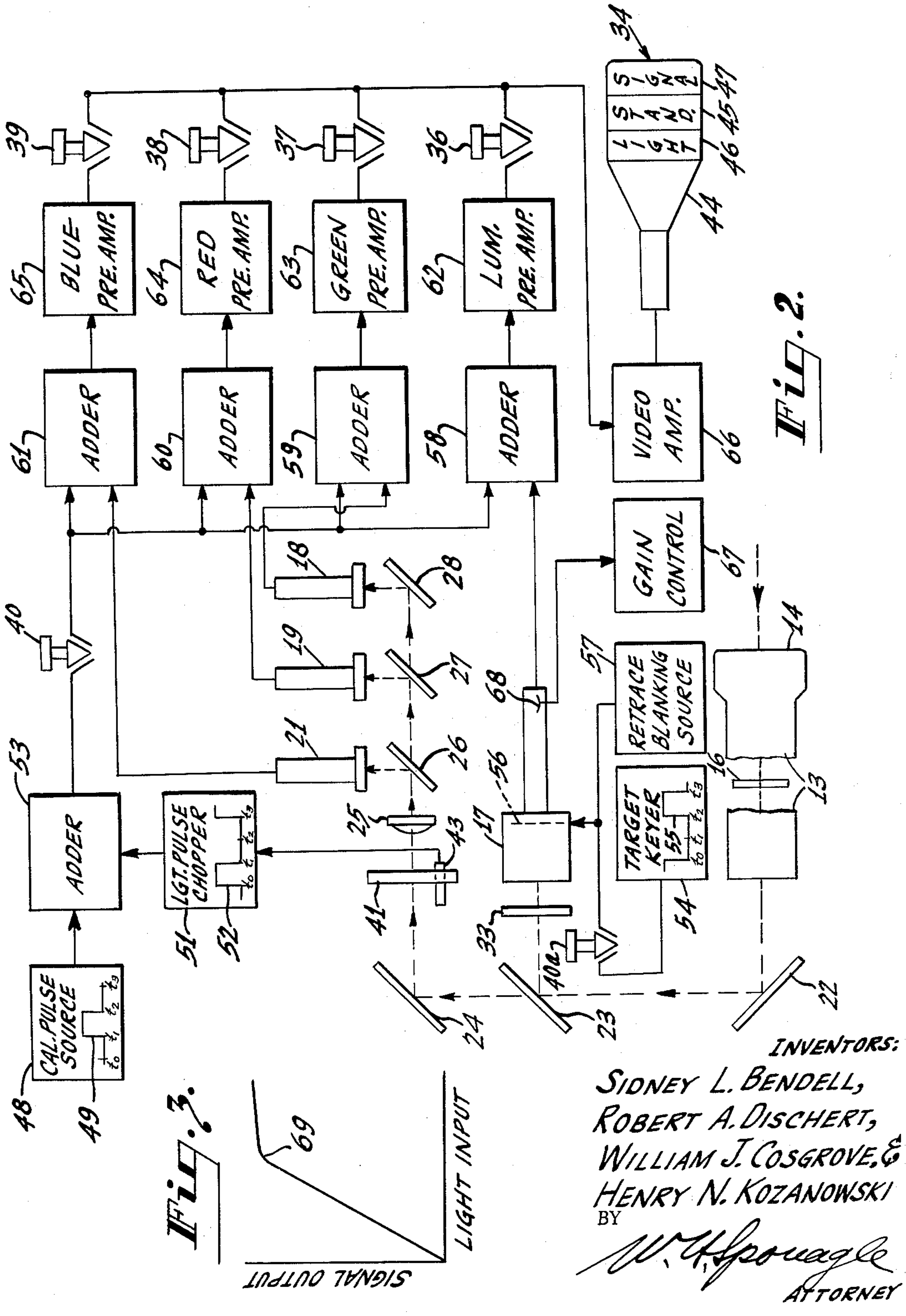
FIGURE 2 is a block diagram of the control circuits of the camera of FIGURE 1 and including the apparatus used in the practice of the invention.
FIGURE 3 is the characteristic curve of the image orthicon type pickup tube used in the color television camera of FIGURE 1.

FIGURE 2 shows the circuit components necessary to enable an operator to align such a color television camera in accordance with this invention. In this figure the components corresponding to those shown in FIGURE 1 are indicated schematically and identified by the same reference characters as used in FIGURE 1. In making the alignment of such a color television camera, the screen 34 of the view finder tube 44 is employed to display three vertical bars of light. The intensity of a centrally disposed bar 45 is used as a standard. Bars 46 and 47 displayed at the left and right of the standard light bar 45 represent respectively the amount of light entering the camera and the video signal derived from one of the pickup tubes. The video type signals impressed upon the view finder 44 to form the three light bars are derived (1) from any of the four pickup tubes 17, 18, 19 and 21 for the bar 47, (2) from the light sampling photodiode 43 for the bar 46 and (3) from a calibration pulse source 48 for the bar 45.

The calibration pulse source 48 produces a pulse 49 once during every horizontal deflection period. The amplitude of this pulse represents the standard light. The pulse is timed to occur during the middle third of the horizontal line period (viz. from time $t_1$ to time $t_2$) so as to control the intensity of the light from the standard light bar 45 on the view finder screen 34.

The signal derived from the photodiode 43 is applied to a light pulse chopper 51 by which to produce a pulse 52 during the first third of each horizontal line period (viz. from time $t_0$ to time $t_1$). The amplitude of the pulse 52 represents the amount of light impressed upon the camera pickup tubes and controls the intensity of the light produced in the bar 46 on the view finder screen 34. The calibration pulses 49 and the light pulses 52 are combined in an adder 53 so as to occur sequentially in a line period as described (viz. from time $t_0$ to time $t_2$).

The image orthicon luminance signal pickup tube 17 is prevented from producing an output signal during the first two-thirds of each horizontal line period by means of a target keyer 54 from which are derived pulses 55 occurring during the last third of each horizontal line period (viz. from time $t_2$ to time $t_3$). These pulses are impressed upon the target electrode 56 of the image orthicon pickup tube by closure of a switch 40*a* which may be ganged for operation with the switch 40. These pulses serve as blanking signals similar in function to the normal retrace blanking signals such as derived from a retrace blanking signal source 57 forming part of the usual sync signal generator (not shown). Even though the entire photoelectron emissive electrode of the image orthicon 17 is illuminated, no output signal is derived from this tube except during the occurrence of the keying pulses 55. Output signals from the chrominance signal vidicon pickup tubes 18, 19 and 21 are derived from these tubes only during the last third of each horizontal line period because the optical mask 41 prevents light from reaching those parts of the photoconductive electrodes of the tubes which are scanned by their respective beams during the first two-thirds of each horizontal line period. Depending upon which one of the control switches 36, 37, 38 or 39 is operated, the output signals from one of the pickup tubes controls the intensity of the light bar 47 on the view finder screen 34.

When the control switch 40 is operated to its closed circuit position, the calibration pulses 49 and the light representative pulses 52 are impressed upon adders 58, 59, 60 and 61 for combination with the output signals derived respectively from the luminance signal pickup tube 17 and the chrominance signal pickup tubes 18, 19 and 21. The composite signal appearing in the output of each of these adders includes a light representative pulse, a standardizing or calibration pulse and a video signal pulse in the named order during each horizontal line period. The adders 58, 59, 60 and 61 are coupled respectively to a luminance signal preamplifier 62, a green signal preamplifier 63, a red signal preamplifier 64, and a blue signal preamplifier 65. The outputs of these preamplifiers are arranged for selective individual coupling to a video signal amplifier 66 by means of the respective control switches 36, 37, 38 and 39. Such an arrangement enables the output signals derived from any selected one of the camera pickup tubes to be displayed on the view finder screen 34. The control switches 40 and 40*a* are operated only during the alignment procedure. During the use of the camera, these switches are in their open circuit positions, allowing only the video output signals derived from any one of the pickup tubes to be applied to the view finder tube 44 and blanking the image orthicon pickup tube only during deflection retrace periods.

The normal camera apparatus is provided also with a gain control 67 by which to vary the potential impressed upon an electron multiplier dynode 68 of the image orthicon pickup tube 17. This apparatus also is used for camera adjustment during the alignment procedure.

In following the alignment procedure in accordance with the present invention, the camera is pointed at a source of white light such as previously described. The optical mask 41 is pivoted to the position shown in solid lines in FIGURE 1 to prevent light from two-thirds of the scene from reaching the vidicon pickup tubes 18, 19 and 21. The target keyer 54 is placed into operation by closure of the switch 40*a* so as to enable derivation of signal output from the image orthicon pickup tube 17 only during the last third of each horizontal line period. The switch 40 is closed to its operating position and output signals from the image orthicon pickup tube are selected by closure of the selector switch 36. The brightness control of the view finder tube 44 is adjusted so that this tube is operating in the vicinity of cutoff. This adjustment affords a greater measure of accuracy since differences in brightness may be more easily discerned at low light levels than when the light intensity is greater. The iris diaphragm 16 is adjusted so that the input light bar 46 is equal in intensity to the standard light bar 45. This indicates that the proper amount of light is being admitted to the camera by the iris 16 to match the desired standard.

The performance characteristics of the pickup tubes 17, 18, 19 and 21 must now be adjusted so as to produce respective output signals properly representative of this white light. Each pickup tube is adjusted in turn. It ordinarily is desirable first to adjust the image orthicon luminance signal pickup tube 17 because this tube has an operating characteristic which is linear for only a certain range of light input. FIGURE 3 shows such a characteristic. The signal output is substantially linear for increases in light input up to a portion of the characteristic curve known as the knee 69. For best operation of an image orthicon, the light input should be confined to the linear portion of the characteristic below the knee. For maximum efficiency it is desired to operate with the greatest light input without going over the knee 69 by over exposure. Such operation is achieved by making the following adjustments.

With the selector switch 36 operated to its closed circuit position, the gain control 67 is adjusted so that the output signal bar 47 on the view finder screen 34 has the same intensity as that of the standard light bar 45 and the input light bar 46. It is not possible from such information to determine where the image orthicon pickup tube is operating on its characteristic curve. To determine this, the iris diaphragm 16 is operated to vary the light input to the pickup tubes. This will cause a variation in intensity of the input light bar 46 on the view finder screen 34. If the output signal bar 47 does not vary appreciably, it is an indication that the light input to the tube 17 is too great, causing it to operate above the knee of its characteristic curve.

A more opaque neutral density filter 33 is placed in front of the image orthicon 17 so as to reduce the amount of light to this tube. With the iris diaphragm 16 again adjusted to its initial position so that the standardizing and input light bars 45 and 46 respectively are of equal intensity, the gain control 67 is readjusted to produce an output signal from the image orthicon to make the output signal bar 47 of the same intensity. Again the light input to the camera is varied by the iris diaphragm and the light bars are observed. This series of steps can be repeated in quite rapid succession until a neutral density filter is selected such that a variation of the iris diaphragm 16 produces similar variations in light intensity in the bars 46 and 47. A selection of the lowest density neutral filter which will produce corresponding variations in the light intensity of these two bars insures that the image orthicon pickup tube is properly adjusted for operation up to the knee of its characteristic curve.

Each of the color vidicon pickup tubes 18, 19 and 21 is separately adjusted by suitable operation of selector switches 37, 38 and 39. These pickup tubes do not require neutral density filters to change their sensitivity. Instead, the voltage applied to the signal electrode of any one of these tubes is varied to produce the proper amplitude of output signal which will produce a signal bar 47 on the view finder screen 34 of the same intensity as that of the standardizing and input light bars 45 and 46.

At the completion of these adjustments, the switches 40 and 40*a* are returned to their open circuit positions and the optical mask 41 is moved out of the light path and into the position shown in broken lines in FIGURE 1. The camera then is ready for use.

What is claimed is:

1. In a color television camera comprising a luminance signal pickup tube responsive to all color components of light admitted to the camera and a plurality of chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means including calibrating pulses of selected amplitude to produce a standardizing light bar on said view finder screen representative of a standard intensity of substantially white light;

means to produce an input light bar on said view finder screen representative of the intensity of light admitted to said camera;

means including signals derived respectively from said pickup tubes to produce an output signal light bar on said view finder screen representative of the light impinging upon said respective tubes;

means for so controlling the light admitted to the camera that said input light bar is equal in intensity to said standardizing light bar; and means for separately adjusting the amplitude of the output signals derived from said respective pickup tubes so that said output signal light bar is equal in intensity to said standardizing and input light bars.

2. In a color television camera comprising a luminance signal pickup tube responsive to all color components of light admitted to the camera and a plurality of chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means for producing calibrating pulses of such amplitude as to represent a standard intensity of substantially white light;

means to produce light-representative signals indicative of the intensity of light admitted to said camera;

means for deriving output signals respectively from said pickup tubes representative of the light impinging upon said respective tubes;

means for impressing said calibrating pulses, said light-representative signals and selected ones of said output signals upon said view finder tube during different intervals of an image-reproducing period so as to produce three adjacently positioned light bars on said view finder tube screen;

means for controlling said pickup tubes so as to produce output signals during only those intervals of each image-reproducing period allocated for operation of said view finder tube by such signals;

means for so controlling the light admitted to the camera that the light bar produced by said light-representative signals is equal in intensity to the light bar produced by said calibrating signals; and means for separately adjusting the amplitude of the output signals derived from said respective pickup tubes so that the light bar produced by said output signals is equal in intensity to the light bars produced by said calibrating signals and said light-representative signals.

3. In a color television camera comprising a luminance signal pickup tube responsive to all color components of light admitted to the camera and three chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

a source of calibrating pulses of such amplitude as to represent a standard intensity of substantially white light;

light detecting means to produce signals representative of the intensity of light admitted to said camera;

means for deriving signals respectively from said pickup tubes representative of the light impinging upon said respective tubes;

means for impressing upon said view finder tube during different intervals of an image-reproducing period signals derived respectively from said source of calibrating pulses, said light detecting means and a selected one of said pickup tubes so as to produce three light bars on said view finder tube screen;

means for selectively impressing said respective pickup tube signals upon said view finder tube;

means for controlling said pickup tubes so as to produce output signals during only those intervals of each image-reproducing period allocated for operation of said view finder tube by such signals;

means for so controlling the light impinging upon said light detecting means that the light bar produced by signals from said detecting means device is equal in intensity to the light bar produced by said calibrating signals; and means for separately adjusting the amplitude of the output signals derived from said respective pickup tubes so that the light bar produced by said pickup tube output signals is equal in intensity to the light bars produced by said calibrating signals and said signals produced by said light detecting means.

4. In a color television camera comprising a luminance signal pickup tube and three chrominance signal pickup tubes, adjustable light-controlling apparatus to control the amount of light admitted to the camera, means to direct a portion of the light admitted to the camera to said luminance signal pickup tube and color components of another portion of said light to said respective chrominance signal pickup tubes, and a cathode ray tube view finder adapted for response to signals from any selected one of said pickup tubes, apparatus for adjusting said camera for operation comprising in combination:

a source of calibrating pulses of such amplitude as to represent a standard intensity of substantially white light;

light detecting means to produce signals representative of the intensity of light admitted to said camera;

means for deriving signals respectively from said pickup tubes representative of the light impinging upon said respective tubes;

means for impressing upon said view finder tube during different intervals of an image-reproducing period signals derived respectively from said source of calibrating pulses, said light detecting means and a selected one of said pickup tubes so as to produce three adjacently positioned light bars on said view finder tube screen;

switching means for selectively impressing said respective pickup tube signals upon said view finder tube;

means for controlling said pickup tubes so as to produce output signals during only those intervals of each image-reproducing period allocated for operation of said view finder tube by such signals;

means including said adjustable light-controlling apparatus for so controlling the light impinging upon said light detecting means that the light bar produced by signals from said light detecting means is equal in intensity to the light bar produced by said calibrating signals; and means for separately adjusting the amplitude of the output signals derived from said respective pickup tubes so that the light bar produced by said pickup tube output signals is equal in intensity to the light bars produced by said calibrating signals and said signals produced by said light detecting means.

5. In a color television camera comprising a luminance signal pickup tube and three chrominance signal pickup tubes, an adjustable iris diaphragm to control the amount of light admitted to the camera, a light divider to direct a portion of the light issuing from said main lens system to said luminance signal pickup tube and the remaining portion of said light to said chrominance signal pickup tubes, a color light splitter to separate said remaining light portion into three color components and to direct said components respectively to said three chrominance signal pickup tubes, and a cathode ray tube view finder adapted for response to signals from any selected one of said pickup tubes, apparatus for adjusting said camera for operation comprising in combination:

a source of calibrating pulses of such amplitude as to represent a standard intensity of substantially white light;

light detecting means to produce signals representative of the intensity of light admitted to said camera;

means for deriving signals respectively from said pickup tubes representative of the light impinging upon said respective tubes;

means for impressing upon said view finder tube successively during each horizontal line period signals derived respectively from said source of calibrating pulses, said light detecting means and a selected one of said pickup tubes so as to produce three vertical adjacently positioned light bars on said view finder tube screen;

switching means for selectively impressing said respective pickup tube signals upon said view finder tube;

means for controlling said pickup tubes so as to produce output signals during only that part of each horizontal scanning period allocated for operation of said view finder tube by such signals;

means including said adjustable iris diaphragm for so controlling the light impinging upon said light detecting means that the light bar produced by signals from said light detecting means is equal in intensity to the light bar produced by said calibrating signals; and means for separately adjusting the amplitude of the output signals derived from said respective pickup tubes so that the light bar produced by said pickup tube output signals is equal in intensity to the light bars produced by said calibrating signals and said signals produced by said light detecting means.

6. In a color television camera comprising a luminance signal pickup tube responsive to all color components of light admitted to the camera and a plurality of chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means for producing three adjacent light bars on said view finder screen, the first being a standardizing light bar representative of a standard intensity of substantially white light, the second being an input light bar representative of the intensity of light admitted to said camera, and the third being an output signal light bar representative of the light impinging upon said respective tubes;

means for so controlling the light admitted to the camera that said input light bar is equal in intensity to said standardizing light bar; and means for adjusting the amplitude of the output signals derived from said respective pickup tubes so that said output signal light bar is equal in intensity to said standardizing and input light bars.

7. In a color television camera, the combination comprising:

an image orthicon type luminance signal pickup tube;

a plurality of vidicon type chrominance signal pickup tubes;

means to control the amount of light admitted to the camera, said light being suitable for proper operation of said chrominance signal pickup tubes but being excessive for proper operation of said luminance signal pickup tube;

means to direct a portion of the admitted light to said luminance signal pickup tube and different color components of said admitted light respectively to said chrominance signal pickup tubes;

means to control the amount of light impressed upon said luminance signal pickup tube suitably for its proper operation; and means to control the magnitude of the video signal output from at least one of said pickup tubes to establish a desired relationship between the impressed light and the video signal output for all of said pickup tubes.

8. In a color television camera, the combination comprising:

an image orthicon type luminance signal pickup tube;

three vidicon type chrominance signal pickup tubes;

means to control the amount of light admitted to the camera, said light being suitable for proper operation of said chrominance signal pickup tubes but being excessive for proper operation of said luminance signal pickup tube;

means to direct a portion of the admitted light to said luminance signal pickup tube and three separated color components of said admitted light respectively to said three chrominance signal pickup tubes;

means to control the amount of light impressed upon said luminance signal pickup tube suitably for its proper operation; and means to control the magnitude of the video signal output from at least one of said pickup tubes to establish a desired relationship between the impressed light and the video signal output for all of said pickup tubes.

9. In a color television camera, the combination comprising:

an image orthicon type luminance signal pickup tube;

three vidicon type chrominance signal pickup tubes;

means to control the amount of light admitted to the camera, said light being suitable for proper operation of said chrominance signal pickup tubes but being excessive for proper operation of said luminance signal pickup tube;

panchromatic means to direct a portion of the admitted light to said luminance signal pickup tube and another portion of said admitted light to said chrominance signal pickup tubes;

means to separate said other admitted light portion into three color components and to direct said components respectively to said three chrominance signal pickup tubes;

means between said panchromatic means and said luminance signal pickup tube to control the amount of light impressed upon said luminance signal pickup tube suitably for its proper operation; and means to control the magnitude of the video signal output from at least one of said pickup tubes to establish a desired relationship between the impressed light and the video signal output for all of said pickup tubes.

10. In a color television camera, the combination comprising:

an image orthicon type luminance signal pickup tube;

three vidicon type chrominance signal pickup tubes;

an adjustable iris diaphragm to control the amount of light admitted to the camera, said light being suitable for proper operation of said chrominance signal pickup tubes but being excessive for proper operation of said luminance signal pickup tube;

a light divider to direct a portion of the admitted light to said luminance signal pickup tube and another portion of said admitted light to said chrominance signal pickup tubes;

a color light splitter to separate said other admitted light portion into three color components and to direct said components respectively to said three chrominance signal pickup tubes;

a variable neutral density filter between said light divider and said luminance signal pickup tube to control the amount of light impressed upon said luminance signal pickup tube suitably for its proper operation; and means to control the magnitude of the video signal output from at least one of said pickup tubes to establish a desired relationship between the impressed light and the video signal output for all of said pickup tubes.

11. In a color television camera including a luminance signal pickup tube responsive to light admitted to said camera from a scene including all color components and a plurality of chrominance signal pickup tubes responsive respectively to selected color components of light admitted to said camera from said scene, and a cathode ray tube view finder adapted to produce on its screen a light image representative of signals impressed thereon, apparatus for adjusting said camera for operation comprising:

means for producing at the left of said view finder screen an input light bar representative of the light admitted to said camera from said scene and at the center of said view finder screen a standardizing light bar representative of a standard substantially white light;

means for rendering said pickup tubes operative only during the last portions of successive horizontal line scanning periods to produce respective output signals representative of the light admitted to said camera from said scene and impressed upon said respective pickup tubes; and means for selectively impressing any one of said output signals upon said view finder tube to produce an output signal light bar at the right of said view finder screen.

12. In a color television camera including a luminance signal pickup tube responsive to light admitted to said camera from a scene including all color components and a plurality of chrominance signal pickup tubes responsive respectively to selected color components of light admitted to said camera from said scene, and a cathode ray tube view finder adapted to produce on its screen a light image representative of signals impressed thereon, apparatus for adjusting said camera for operation comprising:

means for producing on said view finder screen during one portion of each image-reproducing period an input light bar representative of the light admitted to said camera from said scene and during a second portion of each image-reproducing period a standardizing light bar representative of a standard substantially white light;

means for rendering said pickup tubes operative only during a third portion of each image-reproducing period to produce respective output signals representative of the light admitted to said camera from said scene and impressed upon said respective pickup tubes; and means for selectively impressing any one of said output signals upon said view finder tube to produce an output signal light bar during said third portion of each image-reproducing period.

13. In a color television camera including an image orthicon type luminance signal pickup tube responsive to light admitted to said camera from a scene including all color components and a plurality of vidicon type chrominance signal pickup tubes responsive respectively to selected color components of light from said scene, and a cathode ray tube view finder adapted to produce on its screen a light image representative of signals impressed thereon, apparatus for adjusting said camera for operation comprising:

means for impressing signals upon said view finder tube during two portions of each image-reproducing periods to produce on said view finder screen an input light bar representative of the light from said scene admitted to said camera and a standardizing light bar representative of a standard substantially white light;

means for applying an operating voltage to said luminance signal pickup tube for the production of output signals only during a third portion of each image-reproducing period;

means for impressing upon said respective chrominance signal pickup tubes light admitted to said camera from only that part of said scene capable of producing output signals during said third portion of each image-reproducing period; and means for selectively impressing any one of said output signals upon said view finder tube to produce an output signal light bar during said third portion of each image-reproducing period.

14. In a television camera including a pickup tube responsive to light admitted to said camera from a scene, and a cathode ray tube view finder adapted to produce on its screen a light image representative of signals impressed thereon, apparatus for adjusting said camera for operation comprising:

means for impressing signals upon said view finder tube during two portions of each image-reproducing period to produce on said view finder screen an input light bar representative of the light admitted to said camera from said scene and a standardizing light bar representative of a standard substantially white light;

means for rendering said pickup tube operative only during a third portion of each image-reproducing period to produce output signals representative of the light admitted to said camera from said scene and impressed thereon; and means for impressing said output signals upon said view finder tube to reproduce an output signal light bar during said third portion of each image-reproducing period.

15. In a television camera including an image orthicon type pickup tube responsive to light admitted to said camera from a scene, and a cathode ray tube view finder adapted to produce on its screen a light image representative of signals impressed thereon, apparatus for adjusting said camera for operation comprising:

means for impressing signals upon said view finder tube during two portions of each image-reproducing period to produce on said view finder screen an input light bar representative of the light admitted to said camera from said scene and a standardizing light bar representative of a standard substantially white light;

means for applying an operating voltage to said pickup tube for the production of output signals only during a third portion of each image-reproducing period; and means for impressing said output signals upon said view finder tube to reproduce an output signal light bar during said third portion of each image-reproducing period.

16. In a television camera including a vidicon type pickup tube responsive to light admitted to said camera from a scene, and a cathode ray tube view finder tube adapted to produce on its screen a light image representative of signals impressed thereon, apparatus for adjusting said camera for operation comprising:

means for impressing signals upon said view finder tube during two portions of each image-reproducing period to produce on said view finder screen an input light bar representative of the light admitted to said camera from said scene and a standardizing light bar representative of a standard substantially white light;

means for impressing upon said pickup tube light from only that part of said scene capable of producing output signals only during a third portion of each image-reproducing period; and means for impressing said output signals upon said view finder tube to reproduce an output signal light bar during said third portion of each image-reproducing period.

17. In a color television camera comprising an image orthicon type luminance signal pickup tube responsive to all color components of light admitted to the camera and a plurality of vidicon type chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means for producing three adjacent light bars on said view finder screen, the first being a standardizing light bar representative of a standard intensity of substantially white light, the second being an input light bar representative of the intensity of light admitted to said camera, and the third being an output signal light bar representative of the light impinging upon said respective tubes;

means for so controlling the light admitted to the camera that said input light bar is equal in intensity to said standardizing light bar, said admitted light being suitable for proper operation of said chrominance signal pickup tubes but being excessive for proper operation of said luminance signal pickup tube;

means to direct a portion of the admitted light to said luminance signal pickup tube and different color components of said admitted light respectively to said chrominance signal pickup tubes;

means to control the amount of light impressed upon said luminance signal pickup tube suitably for its proper operation; and means for adjusting the amplitude of the output signals derived from said respective pickup tubes so that said output signal light bar is equal in intensity to said standardizing and input light bars.

18. In a color television camera comprising an image orthicon type luminance signal pickup tube responsive to all color components of light admitted to the camera and three vidicon type chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means for producing three adjacent light bars on said view finder screen, the first being a standardizing light bar representative of a standard intensity of substantially white light, the second being an input light bar representative of the intensity of light admitted to said camera, and the third being an output signal light bar representative of the light impinging upon said respective tubes;

means for so controlling the light admitted to the camera that said input light bar is equal in intensity to said standardizing light bar, said admitted light being suitable for proper operation of said chrominance signal pickup tubes but being excessive for proper operation of said luminance signal pickup tube;

means to direct a portion of the admitted light to said luminance signal pickup tube and three separated color components of said admitted light respectively to said three chrominance signal pickup tubes;

means to control the amount of light impressed upon said luminance signal pickup tube suitably for its proper operation; and means for adjusting the amplitude of the output signals derived from said respective pickup tubes so that said output signal light bar is equal in intensity to said standardizing and input light bars.

19. In a color television camera comprising an image orthicon type luminance signal pickup tube responsive to all color components of light admitted to the camera and three vidicon type chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means for producing three adjacent light bars on said view finder screen, the first being a standardizing light bar representative of a standard intensity of substantially white light, the second being an input light bar representative of the intensity of light admitted to said camera, and the third being an output signal light bar representative of the light impinging upon said respective tubes;

means for so controlling the light admitted to the camera that said input light bar is equal in intensity to said standardizing light bar, said admitted light being suitable for proper operation of said chrominance signal pickup tubes but being excessive for proper operation of said luminance signal pickup tube;

panchromatic means to direct a portion of the admitted light to said luminance signal pickup tube and another portion of said admitted light to said chrominance signal pickup tubes;

means to separate said other admitted light portion into three color components and to direct said components respectively to said three chrominance pickup tubes;

means between said panchromatic means and said luminance signal pickup tube to control the amount of light impressed upon said luminance signal pickup tube suitably for its proper operation; and means for adjusting the amplitude of the output signals derived from said respective pickup tubes so that said output signal light bar is equal in intensity to said standardizing and input light bars.

20. In a color television camera comprising an image orthicon type luminance signal pickup tube responsive to all color components of light admitted to the camera and three vidicon type chrominance signal pickup tubes respectively responsive to selected color components of light admitted to the camera, and a cathode ray tube view finder adapted for response to signals from any selected one of said pickup tubes, apparatus for adjusting said camera for operation comprising in combination:

means for producing three adjacent light bars on said view finder screen, the first being a standardizing light bar representative of a standard intensity of substantially white light, the second being an input light bar representative of the intensity of light admitted to said camera, and the third being an output signal light bar representative of the light impinging upon said respective tubes;

an adjustable iris diaphragm for so controlling the light admitted to the camera that said input light bar is equal in intensity to said standardizing light bar, said admitted light being suitable for proper operation of said chrominance signal pickup tubes but being excessive for proper operation of said luminance signal pickup tube;

a light divider to direct a portion of the admitted light to said luminance signal pickup tube and another portion of said admitted light to said chrominance signal pickup tubes;

a color light splitter to separate said other admitted light portion into three color components and to direct said components respectively to said three chrominance signal tubes;

a variable neutral density filter between said light divider and said luminance signal pickup tube to control the amount of light impressed upon said luminance signal pickup tube suitably for its proper operation; and means for adjusting the amplitude of the output signals derived from said respective pickup tubes so that said output signal light bar is equal in intensity to said standardizing and input light bars.

(References on following page)

References Cited by the Examiner

UNITED STATES PATENTS

| | | | |
|---|---|---|---|
| 2,757,232 | 7/1956 | Goodale | 178—5.4 |
| 2,945,086 | 7/1960 | Taylor | 178—5.4 |
| 2,954,427 | 9/1960 | Covely et al. | 178—6.8 |
| 2,969,424 | 1/1961 | Tait | 178—5.4 |

OTHER REFERENCES

Broadcast News, vol. 77, Radio Corporation of America, 1954, pp. 63–64.

DAVID G. REDINBAUGH, *Primary Examiner.*

ROBERT SEGAL, *Examiner.*

J. A. O'BRIEN, *Assistant Examiner.*